United States Patent [19]

Magnenet

[11] 4,449,130

[45] May 15, 1984

[54] PROCESS AND MACHINE FOR MAGNETOGRAPHIC PRINTING (I)

[75] Inventor: Jean Magnenet, Belfort, France

[73] Assignee: Compagnie Internationale Pour L'Informatique Cii-Honeywell Bull (Societe Anonyme), Paris, France

[21] Appl. No.: 380,356

[22] Filed: May 20, 1982

[30] Foreign Application Priority Data

Dec. 23, 1981 [FR] France .............................. 81 24056

[51] Int. Cl.³ .............................................. G01D 15/12

[52] U.S. Cl. ..................................... 346/74.7; 430/39; 430/42

[58] Field of Search ...................... 346/74.7, 74.4, 1.1; 358/301; 430/39, 42, 45, 47

[56] References Cited

U.S. PATENT DOCUMENTS 3,824,601 7/1974 Garland et al. .................... 346/74.4

4,126,494 11/1978 Imamura et al. ................. 148/31.57

*Primary Examiner*—Thomas H. Tarcza

*Attorney, Agent, or Firm*—Kerkam, Stowell, Kondracki & Clarke

[57] ABSTRACT

The invention relates to a printing process and machine which enables the production of two-color images on a print carrier. The machine which carries out this process consists of two applicators (40,42) placed one after the other to deposit two layers of differently colored pigments onto the magnetic drum (10). The surface of the drum has produced thereon a latent magnetic image whose magnetic points have the same intensity of magnetization, but opposite polarities, the magnetic points intended to produce powder-image parts in one of said colors being opposite to that of the points intended to produce the other parts of said image. A transfer station (44,45) is provided with a magnetic field generator (21) located upstream to the point (45) where the pigments are transferred to the print carrier (20). The magnetic-field generator (21) applies a constant magnetic field to the recording surface in a direction perpendicular to the surface. The amplitude (H) and the direction of the magnetic field serves to reduce the intensity of magnetization of the magnetized points intended to produce on the carrier powder image parts whose color is that of one powdery developer and to increase the intensity of magnetization of the other magnetized points. The sole second developer, which has been deposited onto the points whose magnetizations have been increased, is transferred to the print carrier, while the two developers, which have been deposited onto the points whose magnetizations have been reduced, are transferred to said carrier in superimposed layers.

11 Claims, 10 Drawing Figures

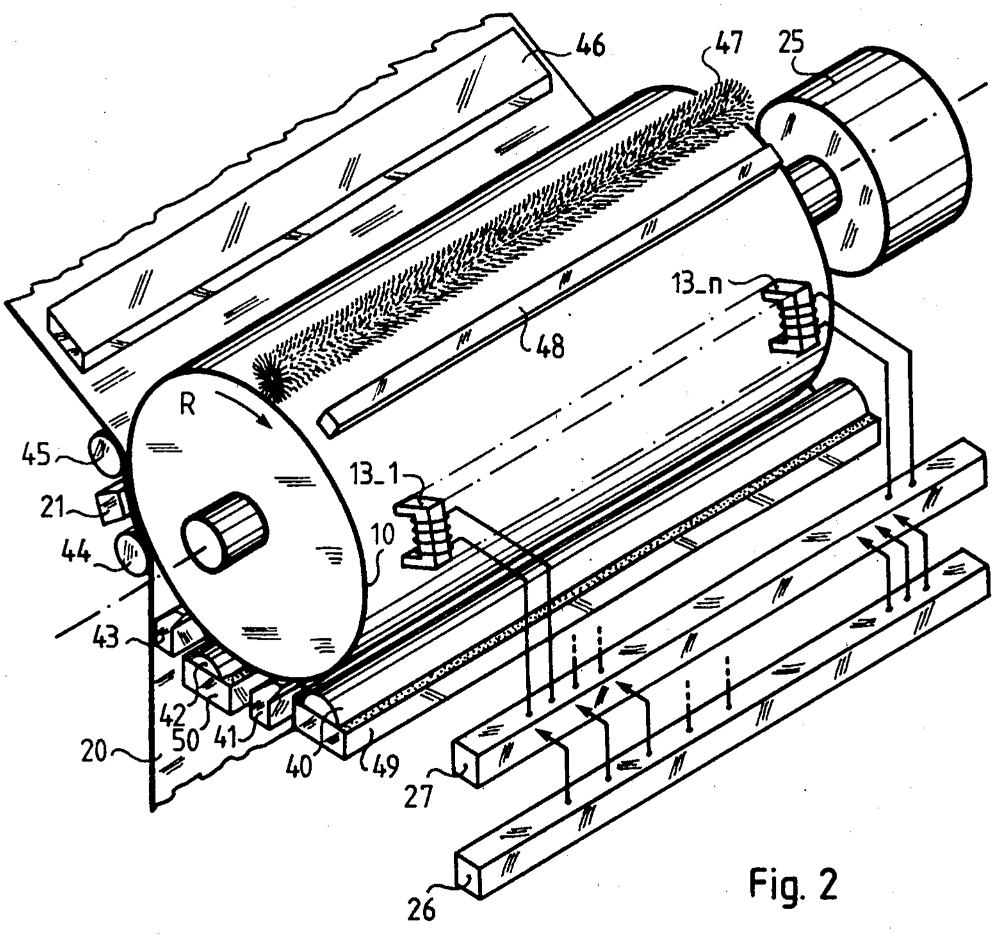
Fig. 2
Fig. 3
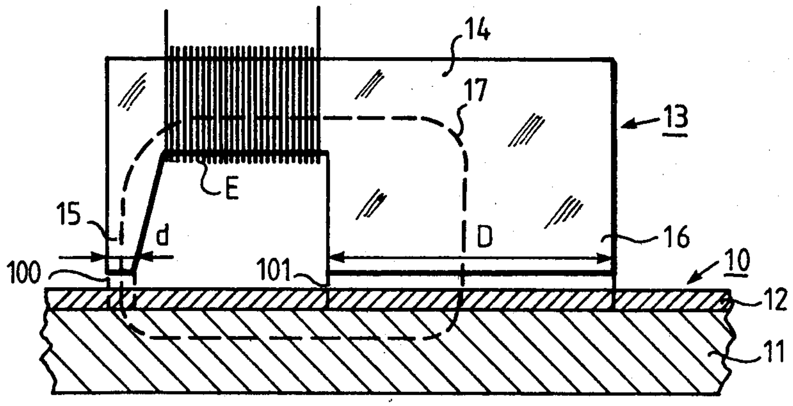

PROCESS AND MACHINE FOR MAGNETOGRAPHIC PRINTING (I)

CROSS REFERENCE TO RELATED APPLICATIONS

The magnetographic printing process described herein is one of four related approaches developed by applicant which enable the production of color images on a print carrier. The other approaches are described and claimed in the following concurrently filed U.S. applications for patent:

Approach II Ser. No. 380,404; filed May 20, 1982; Process and Machine for Magnetographic Printing (II); J. G. Magnenet; corresponding to Fr. Pat. No. 81.24055, filed Dec. 23, 1981.

Approach III - Ser. No. 380,358; filed May 20, 1982; Process and Machine for Magnetographic Printing (II); J. G. Magnenet; corresponding to Fr. Pat. No. 81.24059, filed Dec. 23, 1981.

Approach IV Ser. No. 380,406; filed May 20, 1982; Process and Machine for Magnetographic Printing (IV) J. J. Eltgen; corresponding to Fr. Pat. No. 81.24060, filed Dec. 23, 1981.

BACKGROUND OF THE INVENTION

1. Field of the Invention

The present invention relates to a magnetographic printing process which enables the production of images in color on a print carrier, and a machine for carrying out the process 2. Description of the Prior Art Magnetographic printing machines which, in response to signals received, which originate from a control unit, enable images, e.g., character images, to be produced on a print carrier generally consisting of a paper strip or sheet are known to those skilled in the art. In such printing machines, which may be of a type similar to that described in French Pat. Application No. 2,305,764, corresponding to U.S. Pat. No. 3,945,343 the images are printed, first, by producing from the signals received a latent magnetic image on the surface of a magnetic recording element. The recording element generally is in the shape of a rotating drum or endless belt. The image consists of a group of magnetized zones of very small dimensions. This latent image is then developed by depositing on this surface a powdery developer containing magnetic particles, which remain applied only to the magnetized zones of the recording element so as to produce a powdery image on the surface of that element. Thereupon, the powdery image is transferred to the print carrier.

For certain special applications it may be desirable for the image thus produced to appear on the print carrier in several different colors. In a previously known process, more particularly as described in French Pat. No. 1,053,634, corresponding to U.S. application Ser. No. 221,044, now U.S. Pat. No. 2,826,634 of M. Ralph Blaisdell Atkinson, filed Aug. 14, 1951, a color image is printed on the print carrier by, first, producing on the recording element a latent magnetic image corresponding to the portions of the same color of the image to be printed, developing this latent image by means of a developer of the same color, transferring onto the print carrier the powdery image thus obtained, and repeating this operation as many times as there are colors in the image to be printed. Such a process, however, is obviously inconvenient because it takes a very long time to carry it out. Furthermore, despite all the care taken in centering the various powdery images during their transfer onto the print carrier, it is virtually impossible to prevent shiftings, however slight, from occurring between the different parts of the image thus printed which, of course, deleteriously affects the definition of the image eventually produced on the print carrier.

To overcome the above drawbacks a magnetographic printing process has been proposed, which is described in U.S. Pat. No. 3,965,478. It consists of producing on the surface of the recording element a large number of magnetized elementary zones, all of which produce a latent magnetic image. Each of these elementary zones is obtained by energizing a recording magnetic head by means of an electric current having a frequency which is selected as a function of the color to be produced by this elementary zone when it is developed. The dimensions and the magnetic attraction of this elementary zone are, moreover, determined by the value of the frequency employed. In this process, the development of the latent image formed on the recording element is accomplished by means of a single developer containing particles of different colors and sizes. All particles of the same size are, however, of the same color. During the development of the latent image, the particles of a given size (and, hence, of a given color) are attracted preferentially by the elementary zones, whose dimensions correspond to a given attractive force so that each elementary zone, after the development, is coated with particles whose color corresponds to the frequency that has been used to produce that elementary zone.

In order to carry out such a process, it is, however, necessary to use a developer whose particles of different colors and different sizes must be carefully calibrated, with all the particles of the same color being exactly of the same size. In addition, these particles must be so conditioned that they do not agglomerate, lest they cause errors in color shades during the development of the magnetic latent image. Under these conditions, the fabrication of such a developer is particularly time-consuming, delicate, and relatively expensive. Furthermore, since, the elementary zones formed on the recording element are not all of the same size, depending on the color assigned to them, the images or parts thereof with a shade corresponding to elementary zones of large dimensions produce a definition, i.e., a distinctness of outline and detail, not as good as those whose shade corresponds to elementary zones of small dimensions. Finally, while during the development the elementary zones of small dimensions are capable of attracting only the smallest particles of the developer, it is impossible to prevent the elementary zones of large dimensions from attracting not only the large particles of the developer, but also smaller particles, which, of course, causes the colors to change.

SUMMARY OF THE INVENTION

The present invention overcomes these disadvantages and proposes a magnetographic printing process, as well as a machine for carrying out this process and allows one to obtain on a print carrier and in a relatively short time two color images, while requiring only two developers that exhibit the same granulometric state and the same magnetic characteristics.

The invention relates to a magnetograhic printing process which consists in magnetizing the surface of a magnetic recording element in a direction perpendicular thereto so as to produce a group of magnetized points which form a latent magnetic image, then depositing onto said surface a powdery developer designed to be applied only to the magnetized points of said surface and thus form a powder image and, finally, transferring said powder image to a print carrier, said process being characterized in that in order to make it possible to obtain on said carrier an image in p previously selected colors, p being a whole integer equal to 2. More particularly the process consists in the steps of:

First, magnetizing the surface of the recording element to produce magnetized points having the same intensity of magnetization, but with opposite polarities, the magnetic polarity of the points being intended to produce images or parts thereof which must appear on the carrier in one of the colors being opposite to that of the points intended to produce the other parts of said image;

depositing on to said surface a first powdery developer whose shade is that of the first of said colors;

depositing onto said surface a second powdery developer, whose shade is that of the second color, both developers thus remaining applied, in superimposed layers, to the magnetized points of said surface; and performing a partial transfer to the carrier of the powder image produced on the surface of the recording element, said transfer taking place in the presence of a constant magnetic field oriented perpendicularly to said surface, the amplitude and the direction of said magnetic field being chosen such as to decrease the intensity of magnetization of the magnetized points intended to produce on the carrier image parts whose color is that of said firt powdery developer, and also to increase the intensity of magnetization of the other magnetized points so as to transfer to that carrier only the second developer of the points whose intensities of magnetization have been increased, as well as the two developers which are superimposed on the points whose intensities of magnetization have been decreased.

The invention also relates to a magnetographic printing machine for carrying out the above mentioned process. This machine comprises a recording element provided with a magnetic recording surface, a plurality of magnetic heads controlled by electric pulses and designed to magnetize the recording surface in response to the electric pulses in a direction perpendicular to said surface so as to produce a group of magnetized points thereon which form a latent magnetic image, drive means for bringing about a relative displacement between the recording element and the magnetic heads, a pulse generator designed to emit electrical pulses selectively to the heads, and an applicator means to enable a powdery developer to be deposited onto said recording surface, the developer remaining applied only to the magnetized points of the surface to produce a powder image, and a transfer station to transfer said powder image to a print carrier, the machine being characterized in that, the developer includes particles whose shade is one of the two preselected colors, and also comprises:

current-reversing means inserted between the magnetic heads and the pulse generator for selectively reversing the current direction of the impulses transmitted by said generator and in this way to produce on the recording surface a latent magnetic image whose magnetic points have the same intensity of magnetization, but with opposite polarities, the magnetic polarity of the points intended to produce powder-image parts in one of said colors being opposite to that of the points intended to produce the other parts of said image;

a second applicator means located between the transfer station and the first applicator means for depositing a second powdery developer on said recording surface, said second developer containing particles whose shade is that of the other of said colors, said second developer remaining applied only to the magnetized points of said surface and being superimposed on the first powdery developer; and a magnetic field generator located at the level of the transfer station and used to apply a constant magnetic field to said recording surface in a direction perpendicular to said surface, the amplitude and direction of said magnetic field being designed to reduce the intensity of magnetization of the magnetized points intended to produce on the carrier powder image parts whose color is that of said first powdery developer as well as to increase the intensity of magnetization of the other magnetized points, so that the sole second developer, which has been deposited onto the points whose magnetizations have been increased, is transferred to the print carrier, while the two developers, which have been deposited onto the points whose magnetizations have been reduced, are transferred to said carrier in superimposed layers

BRIEF DESCRIPTION OF THE DRAWINGS

Other features and advantages of the invention will be more readily understood from the consideration of the ensuing description offered by way of non-limitative example, and from the accompanying drawings, in which:

FIG. 2 shows a method of constructing a printing machine for implementing the printing process of the invention;

FIG. 3 is a view showing the principle of transverse magnetization of the recording element forming part of the machine of FIG. 2;

DESCRIPTION OF THE PREFERRED EMBODIMENTS

Figure 1A:
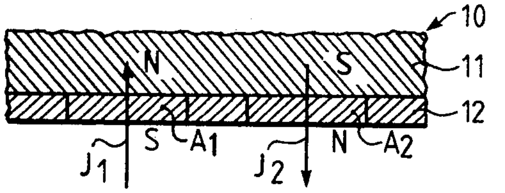
FIGS. 1A through 1E show the various phases of the magnetographic printing process according to the invention.

FIG. 1A shows, in an enlarged section, a known type of recording element (10) which can be sued for carrying out the process of the invention. It is assumed in the example being described that this magnetic recording element is of a type similar to that described and shown in French Pat. No. 2,402,921 corresponding to U.S. Pat. No. 4,205,120 and that it comprises a carrier (11) composed of a material with a high magnetic permeability such as iron or mild steel, said carrier being coated with a layer of highly coercive magnetic material such as, for example, a nickel-cobalt magnetic alloy. In the method for implementing the printing process of the invention, this recording element (10) is magnetized transversely by means of one or several recording heads (13) of the same type as that shown in FIG. 3.

Now, referring to FIG. 3, it can be seen that this recording head (13) includes a magnetic core (14) around which is wound a winding (E) connected to an electrical excitation circuit, which will be described later. This magnetic core (14) is substantially U-shaped and has a profile such that it has at its opposite ends a recording pole (15) and a flux-shutoff pole (16). As can be seen in FIG. 3, these two poles are located near the surface of the magnetic layer (12) so that a closed magnetic circuit is formed by the carrier (11) and the two areas (100) and (101) enclosed by said core and said carrier located plumb against the poles (15) and (16), respectively. It should be noted here that, although in the case illustrated in FIG. 3, the poles (15) and (16) are located near the surface of the magnetic layer (12), a different arrangement could be used in which these two poles would be placed in direct contact with said surface.

FIG. 3 also shows that the width (d) of the recording pole (15) is very small in relation to the width (D) of the flux-shutoff pole (16). Under these conditions, if an electric current with an intensity (I) flows through the coil, this current generates inside the magnetic core (14) a magnetic flux whose mean force line is represented by a broken line (17). In the portion of the magnetic layer (12) located in the area (100) of the recording pole (15), the magnetic field is perpendicular to the surface of said layer (12), so that in this portion the magnetization of the magnetic layer (12) does occur transversely. In this portion, the magnetic field generated by the head (13) is greater than the saturation field of the magnetic layer (12) and, therefore, causes the appearance in said portion of a practically pinpoint magnetized zone, usually termed a magnetized point, said magnetized zone continuing to exist even if no more current flows through the coil (E). On the contrary, in the portion of the magnetic layer (12) located in the area (101) of the flux-shutoff pole (16), because the width of said pole is much greater than that of the recording pole (15), the value of the magnetic field generated by the head (13) is much lower than that of the saturation field of the magnetic layer (12), so that the flux-shutoff pole (16) can cause neither the formation of a magnetized zone in the layer (12) nor a modification of the magnetized zones already formed in said layer. Under these conditions, it is possible to magnetize the magnetic layer (12) so that the magnetized zones thus formed form a latent magnetic image with a given configuration, e.g., the configuration of a character. As an example, in FIG. 5 a group of magnetized zones A is shown arranged as a rectangular matrix with seven lines and five columns, and distributed within said matrix so as to form the image of the character "H".

It should be noted that the spacing pitch (P) for the lines and columns of this matrix is at least equal to the dimension (L) of a magnetized zone. Under these conditions, it has been found that even in the case where this pitch (P) was substantially equal to said dimension (L), the magnetizations exhibited by two adjacent magnetized zones had practically no influence on each other.

It will be recalled that in previously known processes the latent magnetic image which has thus been produced on the surface of the recording element is then developed by depositing on the surface of the magnetic layer (12) a powdery developer containing finely divided particles, each consisting of a thermoplastic organic resin in which a pigment and some magnetic particles have been incorporated. Thereupon the surface of the magnetic layer (12) is subjected to a retouching operation which enables the elimination of the developer particles which are in excess on said surface, so that at the end of the operation only the magnetic zones of said layer remain coated with a developer film, thus forming on the surface of the layer (12) a powder image whose configuration corresponds to that of the magnetized zones. This powder image is then transferred to a print carrier usually consisting of a paper strip. In the present invention, on the contrary, in order for the image produced on the print carrier to appear in previously selected p colors, p being a whole integer at least equal to 2, the following process is used, the various phases of which will now be described with reference to FIG. 1A through 1G.

In the phase shown in FIG. 1A, the recording element (10) is magnetized so as to produce on its surface some magnetized zones, all of which are of the same size and which have equal magnetization values. In FIG. 1A, only two of these zones, designated, respectively as A1 and A2, have been shown for the sake of simplicity, but it will be understood that the number of these magnetized zones can be absolutely anything, subject only to the physical constraints of the apparatus. FIG. 1A likewise shows the magnetic polarities north (N) and south (S), as well as the respective magnetizations $J_1$ and $J_2$ of the zones A1, and A2, each of said magnetizations being indicated by an arrow having a length which is proportional to the value of said magnetization. It can be seen in FIG. 1A that the magnetizations $J_1$ and $J_2$ of the respective zones A1 and A2 have the same value but are oriented in opposite directions so that the south (S) magnetic polarity exhibited by the zone A1 on the surface of the recording element 10 is opposite to the north (N) magnetic polarity exhibited by the zone A2 on that same surface. Generally, all the magnetizations oriented in the same direction are exhibited by the magnetized zones intended to form, on the print carrier, images or parts of images which must appear in two selected colors. However, the magnetization of these zones is oriented in a direction opposite to that of the magnetization of the zones designed to produce on the print carrier images or parts of images that must appear in the other color. Thus, the zones A1 and A2 shown in FIG. 1A with magnetization of equal value but opposite in direction are intended to produce on the printing paper two pinpoint spots of different colors. For example, let it be assumed that the magnetized zone A1 is designed to produce a red pinpoint spot, that the magnetized zone A2 is intended to produce a black pinpoint spot. In order to produce the two magnetized zones A1 and A2, two identical recording heads can be employed, of the type shown in FIG. 3 and which are energized with currents of the same intensities, but flowing in the opposite direction through each of the windings thereof.

After the recording element has been magnetized in the manner described above, a first powdery developer having a shade which is one of the two previously selected p colors is deposited on surface of said element.

In the example being described, it will be assumed that the color of this first powdery developer is red.

Figure 1B:
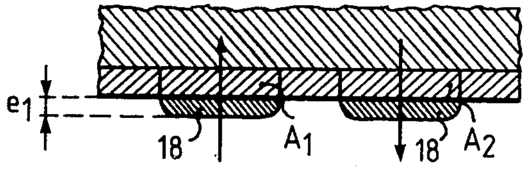
Figure 1C:
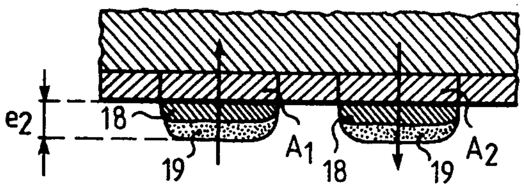

The recording element (10) is then subjected to a retouching operation, upon the completion of which the previously mentioned magnetized zones A1 and A2 appear coated with a fine layer (18) of the first powdery developer, as shown in FIG. 1B. Thereupon a second powdery developer is deposited onto the surface of the recording element, the shade of this second developer being the other of the two selected colors, that is, black in the example described. Subsequently, the recording element (10) is subjected to a second retouching operation, upon the completion of which the magnetized zones A1 and A2 appear coated, as shown in FIG. 1C, with a very fine second layer (19) of the second powdery developer, said second layer (19) being thus superimposed on the first layer (18). Preferably, by utilizing means to be described layer, steps are taken to deposit said two layers (18) and (19) so that, following the second retouching operation, said two layers have approximately the same thickness which approaches a predetermined value $e_1$. Indeed, it should be noted that the force with which are extracted the various particles of the developers extant on the magnetized zones of the recording element depends not only on the magnetization value of these zones and on the distance between each of the particles of the zone onto which they are deposited, but also on the physical characteristics of these developers. Therefore, it will be assumed that both developers employed in the process advocated by the invention have practically the same physical properties, especially the same granulometric state, the same coercive field, the same saturation induction, the same intensity, and the same melting point. Under these conditions, the magnetic force $F_M$ exerted by each of the magnetized zones on each of the particles of one or the other of the two developers which have been deposited onto said zone, varies as a function of the distance (h) between said particle and said zone, in accordance with the law of variations shown by the solid-line curve (30) on the diagram of FIG. 6.

Figure 6:
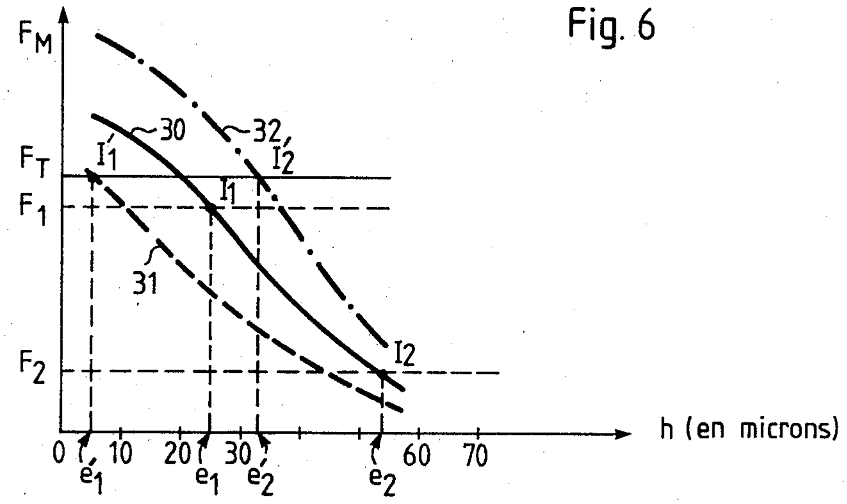
FIG. 6 shows curves illustrating the variations of the magnetic attractive force exerted by each magnetized point before and after applying the constant magnatic field used in the process of the invention.

Also shown in FIG. 6 are the values $F_1$ and $F_2$ of the retouching forces exerted on each of the developer particles during the first and second retouching operation mentioned above, said forces being exerted against or in opposition to the magnetic force $F_M$ referred to above. As can be seen in FIG. 6, these two retouching forces $F_1$ and $F_2$ each have a constant value, the value of the force $F_1$ utilized during the first retouching operation being greater than that of the force $F_2$ utilized during the second retouching operation. The value of the force $F_1$ is such that the ordinate line $F_1$ intersects the curve (30) at a point $I_1$ of abscissa $e_1$ Likewise, the value of the force $F_2$ is such that the ordinate line $F_2$ intersects the curve (30) at a point $I_2$ of abscissa $e_2$ greater than $e_1$. Thus, the value $e_1$ represents the specific value of the distance (h) for which the retouching force $F_1$ is numerically equal to the magnetic force $F_M$ exerted by each magnetized zone on a developer particle located at a distance $e_1$ from said zone. The result is that when on the same zone the developer particles are at a distance from said zone which is greater than $e_1$, the retouching force is greater than the magnetic force exerted by said zone on the particles, so that the latter will be removed from said zone during the first retouching operation. In contrast, when on said zone the developer particles are at a distance from said zone which is smaller than $e_1$, the retouching force $F_1$ is smaller than the magnetic force exerted by said zone on these particles, so that these particles will remain on said zone during the first retouching operation. It will be understood that, following the first retouching operation, a first developer layer having a thickness of $e_1$ is extant on each of the magnetized zones of the recording element (10). Likewise, following the second retouching operation, there remains on each of these magnetized zones a composite layer consisting of a second developer layer (19) superimposed on the first developer layer (18), said composite layer having a thickness of $e_2$. In the example described, it will be assumed that the first developer layer (18) has a thickness of practically 25 microns and that the thickness $e_2$ of this composite layer is approximately 55 microns, so that the thickness of the second developer layer (19) is practically 30 microns. By properly selecting the values $F_1$ and $F_2$ of the retouching forces, it is possible to have a first developer layer (18) with a predetermined thickness of $e_1$ and a second developer layer (19) with a thickness of $(e_2-e_1)$ close to $e_1$.

Figure 1D:
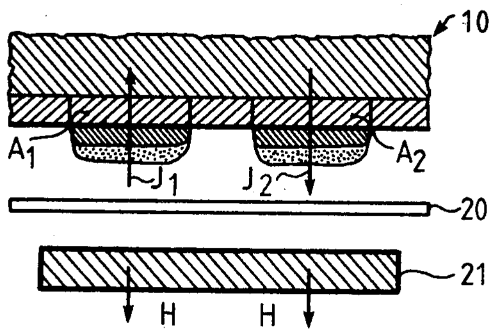
Figure 1E:
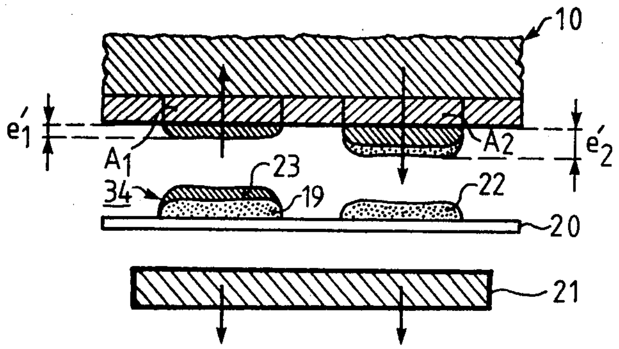

Following the coating of the magnetized zones of the recording element (10) with the two developer layers in the manner just described, a paper strip (20) intended to be printed in the immediate vicinity of said recording element (10) is introduced in the manner shown in FIG. 1D, and said recording element is subjected to the action of a constant magnetic field produced by a magnetic field generator (21). By "immediate vicinity" it is meant that the distance between the paper strip (20) and the surface of the recording element (10) is 1 millimeter at the most. The magnetic field H produced by the generator (21) is oriented perpendicularly to the surface of the recording element (10) and its direction is opposite to that of the magnetization of the magnetized zones for the purpose of producing on the paper strip (20) some pinpoint spots having the shade of the first powdery developer. Therefore, in the example shown in FIG. 1D, where the first developer is red and the zone A1 is the magnetized zone for forming a red pinpoint spot on the paper strip (20), the magnetic field H is oriented in a direction opposite to that of the magnetization $J_1$ of said zone $A_1$. Under these conditions, due to the effect of said magnetic field, there is a reduction in the magnetization of the magnetized zones (e.g., zone A1) designed to produce pinpoint spots having the color of the first developer, while the magnetized zones, such as $A_2$, is increased. The result is a decrease in the magnetic attractive force exerted by each of the magnetized zones whose magnetization has been reduced, the variations of said attractive force, depending upon the above-mentioned distance (h), being represented by the dotted-line curve (31) on the diagram of FIG. 6. In contrast, the magnetic attractive force exerted by each of the magnetized zones, whose magnetization has been augmented, increases, the variations of said attractive force, depending upon said distance (h), being represented by the dot-and-dash curve (32) on the diagram of FIG. 6.

While the recording element (10) thus remains subjected to the action of the magnetic field produced by the generator (21), the paper strip (20) is made to contact said recording element, whereupon each of the particles of one or the other developer which is on said element is subjected to the action of a so-called transfer force which attracts each of these particles toward the paper strip (20), thus transferring some of these particles to said paper strip. This transfer operation can, moreover, be achieved either by pressing the paper strip (20)

onto the recording element (10) or by using magnetic or electrostatic means. However, it will be assumed that, whatever the means employed to perform this transfer operation, the transfer force utilized in the course of this operation maintains a constant value $F_T$. The value $F_T$ of this force is shown on the diagram of FIG. 6. On the same diagram, $e'_1$ and $e'_2$ designate the respective abscissas of the points $I'_1$ and $I'_2$ where the above-mentioned curves (31) and (32) intersect the ordinate line $F_T$.

It should be noted that the amplitude of the magnetic field H, which brings about a modification of the magnetic attractive forces exerted by each of the magnetized zones of the recording element, is such that the abscissa $e'_1$ of the above-mentioned point $I'_1$ is smaller than 0.5 $e_1$, while the abscissa $e'_2$ of the above-mentioned point $I'_2$ is smaller than 1.5 $e_1$, but greater than $e_1$. The determination of the amplitude of the magnetic field H, which enables the values $e'_1$ and $e'_2$ satisfying those conditions to be obtained, can be achieved either mathematically or experimentally by varying the amplitude of said magnetic field and by measuring, for each of the different values of said field, the intensities of the corresponding magnetic forces being exerted at various distances (h) by the magnetized zones whose magnetizations have thus been modified, then by tracing the two curves (31) and (32), which correspond to each of the amplitudes of the magnetic field H. In this way, one obtains for the various values of said magnetic field a series of curves (31) and (32). This permits, by determining the abscissas of the points of intersection of these two curves with the above-mentioned ordinate line $F_T$, the recording of the values of the magnetic field for which these abscissas satisfy the conditions cited above. Thus, in the example described where the value of $e_1$ has been found to be approximately 25 microns, the amplitude of this magnetic field is such that the abscissa of the above-mentioned point $I'_1$ is approximately equal to 6 microns (therefore, smaller than the limit value of 12.5 microns), while the abscissa of the above-mentioned point $I'_2$ is approximately equal to 33 microns (therefore, smaller than the limit value of 37.5 microns), but larger than 25 microns. Under these conditions, if the transfer takes place on the paper strip (20) of the developers deposited onto the magnetized zones of the recording element (10) of FIG. 1D, it will never be possible to achieve a complete transfer. Indeed, in the case of developer particles which, on each of the magnetized zones (e.g., A2) where the magnetizations have been increased, lie at a distance less than $e'_2$ from said zone, said particles are often subjected to a magnetic attractive force greater than the transfer force, so that these particles will not be transferred at all and will consequently remain on the recording element (10). Likewise, on each of the zones (e.g., A1) where the magnetizations have been decreased, the particles lying at a distance less than $e'_1$ from said zone will not be transferred at all. Therefore, the only particles transferred to the paper strip (20) will be those which, on each of the zones where the magnetizations have been increased, are located at a distance greater than $e'_2$, as well as the particles which, on each of the zones where the magnetizations have been decreased, are at a distance greater than $e'_1$. Considering that the value of $e'_1$ (6 microns in the example described) is smaller than the thickness of the first developer layer (18) (25 microns in the example selected) and that the value of $e'_2$ (33 microns in the chosen example) is larger than the thickness of said layer (18), but smaller than the total thickness of the layers (18) plus (19) of the two developers (55 microns in the chosen example), it can be seen that this transfer operation results in the transfer to the paper strip (20).

FIG. 2 shows a magnetographic printing machine for producing a two color print according to the printing process described herein. The machine shown in this figure comprises a magnetic recording element in the shape of a magnetic drum (10) similar to that described and shown in the French Pat. No. 2,402,921 noted above, said drum being driven by an electric motor (25) in the direction of arrow R. The magnetization of the magnetic layer of said drum is ensured by a group of n magnetic heads 13-1 through 13-n arranged side by side and aligned parallel to the axis of rotation of the drum. Said heads, of the type shown in FIG. 3, are excited selectively by electric pulses emitted by pulse generator (26) and applied to the windings of said heads by means of a current-calibrating means (27) whose structure is shown in detail in FIG. 4.

Figure 4:
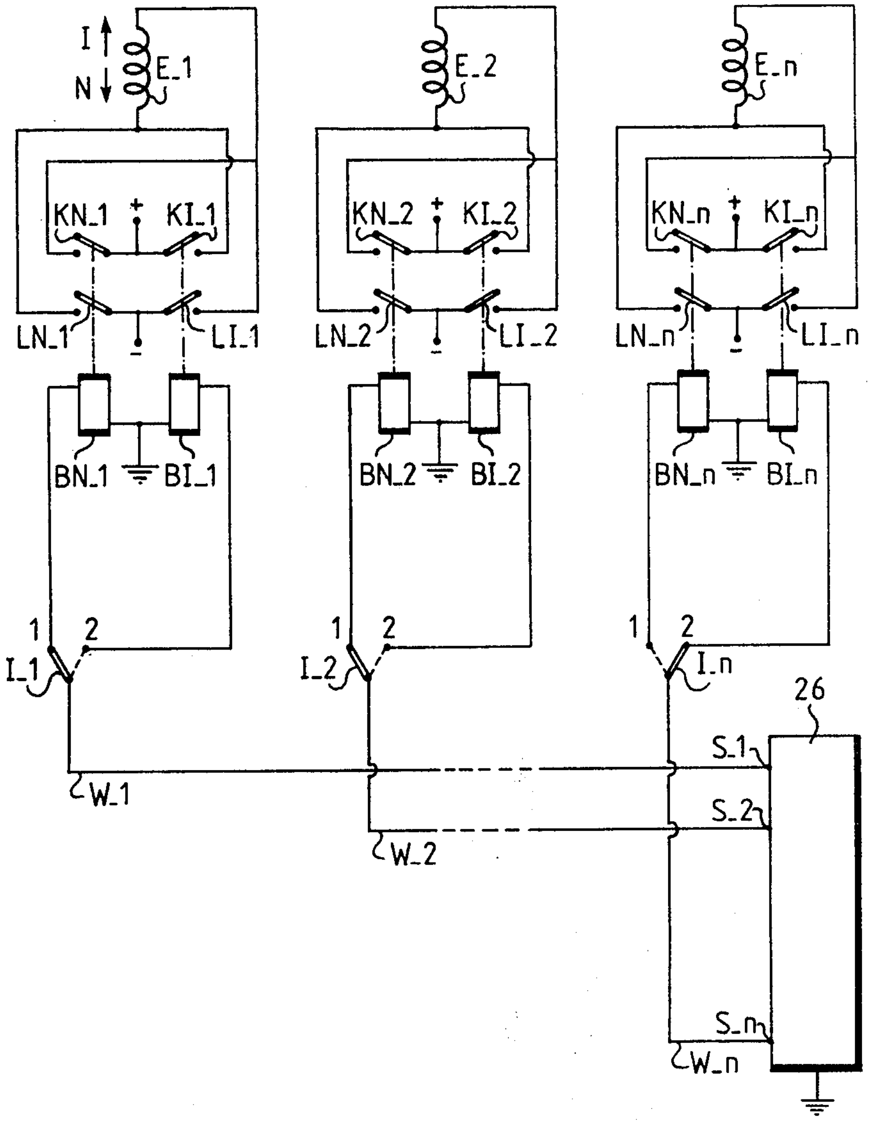
FIG. 4 shows a diagram of the electric circuit used to control the various recording magnetic heads of the machine of FIG. 2.

Now, referring to FIG. 4, each of the windings E-1 through E-n of the magnetic heads 13-1 through 13-n is connected to two terminals (+) and (−) of a direct-current source by means of four contacts designated in FIG. 4 as KN, KI, LN and LI followed by the index number of the winding E each of them controls. Thus, for example, the group consisting of the four contacts KN-1, KI-1, LN-1, LI-I corresponds to the winding E-1.

Similarly, the group of four contacts KN-2, KI-2, LN-2, LI-2 corresponds to the winding E-2, and so forth. The contacts KN and LN of the same group are controlled simultaneously by a relay coil BN, while the contacts KI and LI of this group are controlled simultaneously by a relay coil BI. These coils BN and BI carry the same index number as that of the contacts they control. All these coils BN-1 through BN-n and BI-1 through BI-n can be energized by electrical impulses supplied at the outputs S1 through Sn of the pulse generator (26). To accomplish this, each of the coils BN-1 through BN-n is connected to each one of the n reversing contacts I-1 through I-n, each of these contacts being, in turn, connected to each one of the outputs S1 through Sn by means of each one of n conductors Wl through Wn. FIG. 4 shows that each of these contacts I-1 through I-n includes two positions designated 1 and 2 in the figure, each of the coils BN-1 through BN-n being actually connected to each one of the outputs S1 through Sn only if the reversing contact with which it is associated is in position 1. Similarly, each of the coils BI-1 through BI-n is connected to each one of the outputs S1 through Sn of the generator (26) by means of each one of the reversing contacts I-1 through I-n, the connection between each of these coils and each of said outputs being actually assured only if the reversing contact with which said coil is associated is in position 2.

The structure of the pulse generator (26) will not be described here, since this type of structure is known. It will be assumed here that, in the example described, the structure of pulse source (26) is similar to that of the recording control device shown in French Pat. No. 2,443,335 corresponding to U.S. application Ser. No. 089,039 of J. Eltgen, et al., (Cii/HB 2225) filed Oct. 29, 1979, and assigned to the assignee of the present invention, now U.S. Pat. No. 4,312,045.

Where the machine of FIG. 2 is used to print characters made up of points located inside a rectangular matrix comprising seven lines and five columns, for the line of said matrix extending in a direction parallel to the axis of rotation of the drum (10), the latent magnetic image required for printing a character is obtained by exciting selectively five adjacent heads chosen from the group of magnetic heads 13-1 through 13-n seven different times. Said excitation is effected by means of pulses delivered at successive instants $t_1$, $t_2$, $t_3$, $t_4$, $t_5$, $t_6$ and $t_7$ at five of the corresponding outputs S1 through Sn of the pulse generator (26). Thus, for example, in order to form the latent magnetic image required for printing the character G by means of the magnetic heads 13-1 through 13-5, the pulse generator (26) delivers at instant $t_1$ a pulse at each of its outputs S2 through S4 at instant $t_2$ a pulse at each of its outputs S1 and S5; at instant $t_3$ a pulse at its output S5; at instant $t_4$ a pulse at each of its outputs S1, S2, S3 and S5; at instant $t_5$ a pulse at each of its outputs S1 and S5; at instant $t_6$ a pulse at each of its outputs S1 and S5; and, finally, at instant $t_7$ a pulse at each of its outputs S2 through S4.

Figure 5:
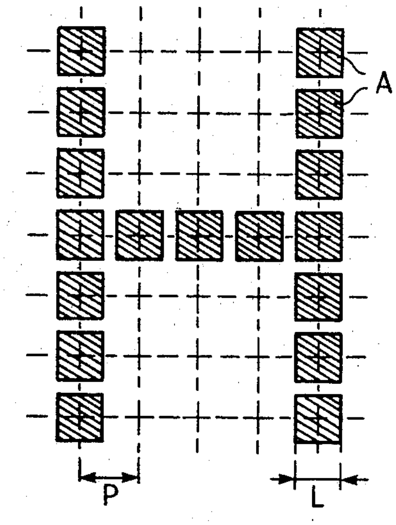
FIG. 5 is a view of the arrangement of the magnetized points which have been produced on the recording element to form the latent magnetic image of a character.

This can perhaps be best visualized by drawing a rectangular matrix of seven lines and five columns, is shown in FIG. 5, labeling the lines $t_1$ through $t_7$ from the top to bottom and the columns $S_1$ to $S_5$ and shading a zone area for each delivered pulse on the appropriate time line and column.

The reversing contacts I-1 through I-n are designed to determine the direction in which the magnetization of the magnetized zones on drum (10) will be oriented. This direction conditions the color of the pinpoint spot which will subsequently be produced on the paper by each of these magnetized zones. To accomplish this, each of the reversing contacts I-1 through I-n is associated with each one of the magnetic heads 13-1 through 13-n. In case a reversing contact is tipped to its position 1, the impulse reaching said reversing contact from the generator (26) is routed to the coil BN with which it is associated. Alternately, in case other reversing contact is tilted to its position 2, said impulse is routed to the coil BI which is associated with said reversing contact. Thus, for example, if, at the moment an impulse is delivered at the output S1 of the pulse generator (26), the reversing contact I-1 is in position 2, said impulse is fed to coil BI-1. The coil BI-1, which is thus temporarily energized by said impulse, thereupon briefly closes its contacts KI-1 and LI-1 so that a direct current flows momentarily through the winding E-1 of the head 13-1 in the direction of arrow I. Thereby, said magnetic head 13-1 produces on the drum surface (10) a magnetized zone which is practically a pinpoint; this zone exhibits a magnetization J which is extant even after the current has disappeared. It will be assumed in the example described that in the case where the direction of the current flowing momentarily through the winding of the head is that indicated by the arrow I, the magnetization of the magnetized zone thus produced by said head on the drum (10) is oriented in the direction of arrow $J_2$ in FIG. 1A. Alternately, in the case where the direction of the current flowing momentarily through the winding of the head is that of the arrow N in FIG. 4, the magnetization of the magnetized zone thus formed by said head on the drum is oriented in the direction of arrow $J_1$ in FIG. 1A. Considering that the direction in which the current flows through each winding is determined by the position of the reversing contact associated with said winding, it can be seen that, by properly positioning the reversing contacts I-1 through I-n before the pulse generator (26) delivers impulses at these outputs, magnetized zones with a magnetization oriented in the desired direction will be obtained on the drum (10) when these impulses are emitted. Thus, if, for example, one desires to obtain on the drum (10), by means of the heads 13-1 through 13-5, a latent image having the configuration of a character such as the one shown in FIG. 5, said latent image being such that the magnetized zones producing it have a magnetization oriented in the direction of arrow $J_1$, it suffices to place the reversing switches I-1 through I-5 in position 1 prior to energizing the magnetic heads 13-1 through 13-5. Alternately, if it is desired that these magnetized zones have a magnetization oriented in the direction of the arrow $J_2$, it suffices to place the reversing contacts I-1 through I-5 in position 2 prior to energizing the heads 13-1 through 13-5. The positioning of the reversing contacts I-1 through I-n in either position 1 or 2 can be accomplished either manually by the operator prior to any printing operation, or fully automatically, in which case the reversing contacts I-1 through I-n are controlled by operating means of a conventional type energized by the same control unit controlling the operation of the pulse generator (26). It should be noted that, depending on the case and the application, some of the reversing contacts I-1 through I-n can be placed in position 2, while the other reversing contacts are placed in position 1 which, during the printing of a line of characters, for example, enables characters to be obtained which are printed in one of the two colors, while the other characters are printed in the other color.

It should also be noted that the current-reversing means (27) shown in FIG. 2 in the example desribed consists of an assembly that contains the reversing contacts I-1 through I-n, the coils BN-1 through BN-n, and BI-1 through BI-n, and the contacts KN-1 through KN-n, KI-1 through KI-n, LN-1 through LN-n, and LI-1 through LI-n, all these elements being connected together as shown in FIG. 4.

Now, reverting to FIG. 2, it will be seen that the printing machine designed according to the teachings of the invention also includes a first applicator means (40) of known construction, which enables particles of a first powdery developer contained in a tank (49) to be applied to the surface of the drum (10). In the example described, it is assumed that the color of said first developer is red. This first applicator means (40) is designed to deposit on each of the magnetized zones of the drum (10) a first developer layer approximately 60 microns thick. It is assumed that this applicator means (40) is preferably of the same type as those described and shown in French Pat. Nos. 2,408,462 corresponding to U.S. Pat. Nos. 4,246,588 and 2,425,941, corresponding to U.S. Pat. No. 4,230,069, said device including on the one hand a rotating magnetic element which brings the developer tank (49) particles near the surface of the drum and, on the other, a deflector inserted between said element and the drum so as to form a trough in which are accumulated the particles collected by said deflector. Said deflector leaves between itself and the drum a very small opening of about 1 millimeter, through which pass the particles which have come to be applied to the surface of said drum. The magnetized zones of the drum (10), which have thus been coated with a first developer layer, then move past a first retouching device designed on the one hand, to eliminate the developer particles extant on the drum 10 outside the magnetized zones, and on the other hand, to remove the developer access from these zones so that the developer layer thickness is equal to the value determined earlier. This retouching device may be magnetic, electrostatic, or pneumatic. In the example described, the retouching device (41) is assumed to be of the type described and shown in French Pat. No. 2,411,435 corresponding to U.S. application Ser. No. 965,412 of J. J. Binder, filed Nov. 25, 1980, and assigned to the assignee of the present invention, now abandoned in favor or continuation application Ser. No. 210,312, filed Nov. 12, 1980 now U.S. Pat. No. 4,348,648 and which is adjusted so as to leave extant on the zones of magnetization only a first developer layer approximately 25 microns thick. The magnetized zones of the drum (10) which have moved past the retouching device (41) then move past a second applicator means (42) of a type similar to that of the first applicator means, said second applicator means enabling particles from a second powdery developer, which is black in the example described and is contained in a tank (50) to be deposited onto the drum (10). Said second applicator means (42) is designed to apply a second developer layer, on the one hand, to each of the already deposited first developer layers, said second layer being approximately 60 microns thick.

Since in the example described the thickness of the first developer layer is practically 25 microns, the total thickness of these two layers is therefore at least 85 microns. In the example described, the total thickness is assumed to be of the order of 100 microns. The magnetized zones of the drum (10) which are then coated with these two superimposed layers then move past a second retouching device (43) similar to the retouching device (41). This second retouching device (43) enables on the one hand the elimination of the second developer particles still extant on the drum (10) from the magnetized zones and, on the other, the reduction of the thickness of the second developer which is superimposed on the first developer layer so that, preferably, the thickness $e_2$ and $e_1$ of said second layer is practically equal to the value $e_1$ determined above. In the example described, it is assumed that the second retouching device (43) is adjusted so that said second layer is practically 30 microns thick. Under these conditions, the total thickness of the combined two layers thus superimposed is approximately 55 microns.

Figure 7:
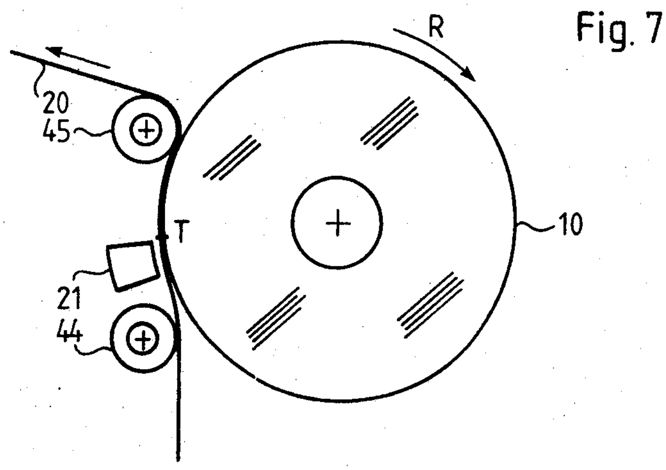
FIG. 7 shows the structure of the transfer station of the machine shown in FIG. 2.

The magnetized zones of the drum (10) which have undergone said second retouching operation are then brought to the immediate vicinity of a paper strip (20) on which is to be transferred a portion of the two developers which have been deposited onto the surface of the drum (10). To do this, the machine in FIG. 2 includes a transfer station which, in the example described, is comprised of two rollers (44) and (45), through which passes the paper strip (20). The roller (45) is a pressure roller which enables the paper strip (20) to be applied to the drum (10) with a force of a given value. It has been determined that in order to properly transfer the developers onto the paper strip (20), said force should not exceed 600 newtons per linear meter. In the example described, said force has been adjusted by known means, such as springs (not shown), to be approximately 200 newtons per linear meter. The roller (44) which is fitted upstream to the roller (45) in relation to the unwinding direction of the drum and the paper strip is, instead, a guide roller which, as can be seen in FIG. 7, enables the paper strip (20) to be brought to the immediate vicinity of the surface of the drum (10) shortly before said strip is pressed thereagainst. FIG. 7 indeed shows that the point T where the strip (20) comes into contact with the drum (10) is located between the rollers (44) and (45). The machine shown in FIG. 2 also includes a magnetic field generator (21) which is placed on the level of the transfer station, that is, between the rollers (44) and (45). In the example described said generator (21) consists of a permanent magnet. However, it should be noted that this magnet may be replaced by any other equivalent means, e.g., a magnetic induction coil energized by a direct curent. The direction and the magnitude H of the magnetic field produced by said generator (21) are selected in the manner explained in detail above, so that during the transfer the paper strip receives on the one hand the greater part of the second developer layer deposited onto the magnetized zones designed to form on the paper some pinpoint spots having the color of said second developer and, on the other hand, all of the second developer layer and the greater part of the first developer layer which have been deposited and superimposed on the magnetized zones intended to produce on the paper pinpoint spots having the color of the first developer. FIG. 7 shows that the magnetic field generator (21) is fitted preferably between the guide roller (44) and the above-mentioned point T, but very close to said point T. It has been found that such an arrangement improves the efficiency of the transfer and the quality of the image produced on the paper during said transfer.

The machine shown in FIG. 2 also includes a developer fixing means (46) under which passes the paper strip (20) once the just-described transfer operation is completed. Said fixing means (46), composed of an electrically heated element in the example described, is intended to fix permanently the developers which have been transferred to the paper strip (21). It should be noted that said fixing device (46) is adjusted so that these developers are not subjected to any fusion but only to a softening sufficient to ensure their fixation onto the paper. Under these conditions, there is no risk at all that the colors in the piles of developers which, such as (34), include developer layers of different shades, will mix. Thus, each of the developer piles such as (34), once cooled on the paper, forms a pinpoint spot having the shade of the first developer, while each pile, such as (22), after it has cooled on the paper, forms a pinpoint spot having the shade of the second developer.

The machine shown in FIG. 2 also includes a cleaning device which consists of a brush (47) in the example described to ensure the cleaning of the parts of the drum surface which have moved past the transfer station. Following this cleaning, said parts move past an electromagnetic erasing device (48), which erases the latent magnetic images carried by said parts, so that the latter are again capable of being magnetized when they next move past the group of magnetic heads 13-1 through 13-n.

It will be understood, of course, that while particular embodiments of the invention have been shown, the invention is not limited thereto since many modifications may be made and it is, therefore, contemplated to cover by the appended claims any such modifications as fall within the true spirit and scope of the invention.

I claim:

1. A magnetographic printing process for obtaining on a print carrier an image in two preselected colors, comprising the steps of:

magnetizing the surface of a recording element to form magnetized points having the same intensity of magnetization, but with opposite polarities, the magnetic polarity of the points intended to produce image parts which, on the carrier, must appear in one of said colors being opposite to that of the points intended to produce the other parts of said image;

depositing onto said surface a first powdery developer whose shade is that of the first of said colors;

depositing onto said surface a second powdery developer, whose shade is that of the second color, both developers thus remaining applied, in superimposed layers, to the magnetized points of said surface;

establishing a constant magnetic field; and partially transferring to the carrier the powder image produced on the surface of the recording element, said transfer taking place in the presence of said constant magnetic field oriented perpendicularly to said surface, the amplitude and the direction of said magnetic field being chosen such as to decrease the intensity of magnetization of the magnetized points intended to produce on the carrier image parts whose color is that of said first powdery developer, and also to increase the intensity of magnetization of the other magnetized points so as to transfer to said carrier only the second developer of the points whose intensities of magnetization have been increased, as well as the two developers which are superimposed on the points whose intensities of magnetization have been decreased.

2. The printing process as set forth in claim 1, further including a retouching operation exerting a magnetic force ($F_m$) following each operation for depositing the developer onto the surface of the recording element, where n corresponds to the order number of the retouching operation, said magnetic force $F_m$) being exerted in opposition to the magnetic attractive force ($F_m$) exerted by each magnetized point on a developer particle deposited onto said point which varies in accordance with the distance separating said particle from said point the value of the force ($F_2$) exerted during the second retouching operation being less than the value of the force ($F_1$) exerted during the first retouching operation and is selected.

3. The printing process as set forth in claim 2 wherein the value of the forces of the first and second retouching operations are such that the thickness ($e_2$) of the second developer layer is approximately equal to the thickness ($e_1$) of the first developer layer.

4. The printing process as set forth in claim 2 wherein $e'_1$ represents the distance for which said magnetic force, when it is reduced by the constant magnetic field, is equal to the transfer force and $e'_2$ represents the distance for which said magnetic force, when it is increased by the constant magnetic field, is equal to said transfer force, the amplitude of said constant magnetic field being such that the value of said distance $e'_2$ is less than 1,5 $e_1$ while the value of said distance $e'_1$ is less than 0.5 $e_1$, $e_1$ being the thickness of the first developer layer which results from the first retouching operation.

5. The process as set forth in claim 4 wherein said distance $e'_2$ is greater than $e_1$.

6. A magnetographic printing machine for printing an image in two preselected colors on a print carrier comprising a recording element (10) having a magnetic recording surface, a plurality of magnetic heads (13-1 through 13-n) controlled by electric pulses and adapted to magnetize said recording surface in response to said pulses in a direction perpendicular to said surface so as to produce thereon a group of magnetized points (A), driving means (25) for bringing about a relative displacement between the recording element and the magnetic heads **(13*a*–13*n*), pulse generator means (28) for selectively transmitting electrical pulses to said heads, applicator means (40) to allow a powdery developer to be deposited onto said recording surface, said developer containing particles whose shade is one of the two preselected colors and remaining applied only to the magnetized points of said surface in order to produce a powder image, and a transfer station (44 45) to transfer said powder image to a print carrier; and current-reversing means (27) connected between the magnetic heads (13-1 through 13-n) and the pulse generator (26) for selectively reversing the curent direction of the pulses emitted by said generator so as to produce on the recording surface a latent magnetic image whose magnetic points have the same intensity of magnetization ($J_1$, $J_2$) but with opposite polarities, the magnetic polarity of the points intended to produce powder-image parts in one of said colors being opposite to that of the points intended to produce the other parts of said image a second applicator means (42) located between the transfer station (44, 45) and the first applicator means (40) for depositing a second powdery developer on said recording surface, said second developer containing particles whose shade is that of the other of said colors, said second developer remaining applied only to the magnetized points of said surface and being superimposed on the first powdery developer; and magnetic-field generator means (21)** at the transfer station for applying a constant magnetic field to said recording surface in a direction perpendicular to said surface, the amplitude (H) and the direction of said magnetic field being such as to reduce the intensity of magnetization of the magnetized points intended to produce on the carrier powder image parts whose color is that of said first powdery developer and to increase the intensity of magnetization of the other magnetized points, so that the sole second developer, which has been deposited onto the points whose magnetizations have been increased, is transferred to the print carrier, while the two developers, which have been deposited onto the points whose magnetizations have been reduced are transferred to said carrier in superimposed layers.

7. The printing machine as set forth in claim 6, further comprising a first retouching device (41) located between the two applicator means (40, 42) and adjusted such as to leave extant on each magnetized point of the recording surface only a first developer layer having a thickness which is approximately equal to a predetermined value ($e_1$) and a second retouching means (43) located between the second applicator means (42) and the transfer station (44, 45) and adjusted such as to leave extant on each of the first developer layers only a second developer layer having a thickness which is approximately equal to said value ($e_1$)

8. The printing machine as set forth in one of claims 6 or 7 wherein the recording element is a magnetic drum (10) and the transfer station (44, 45) comprises, on the one hand, a pressure roller (45) for applying the print carrier (20) against said drum and, on the other hand, a guide roller (44) located upstream to the pressure roller to enable said carrier to come into contact with said drum at a point (T) located between said two rollers, the magnetic-field generator (21) being located approximately at the level of said point.

9. The printing machine as set forth in claims 6 or 7 wherein the magnetic-field generator (21) is a permanent magnet.

10. The printing machine as set forth claims 6 or 7, further including fixing means (46) located along the path followed by the print carrier and downstream to the transfer station (44, 45), said fixing means being adjusted such as to allow the developer particles which, situated on said carrier, move past said fixing means, to be subjected to softening, but not to a fusion.

11. The printing machine as set forth in claim 10 wherein said fixing means is a heater.

* * * * *

UNITED STATES PATENT AND TRADEMARK OFFICE

CERTIFICATE OF CORRECTION

PATENT NO. : 4,449,130

DATED : May 15, 1984

INVENTOR(S) : Jean Magnenet

It is certified that error appears in the above-identified patent and that said Letters Patent is hereby corrected as shown below:

Column 15, line 38, "Fm)" should read -- (Fm) --.

Signed and Sealed this

*Sixth* Day of *November 1984*

[SEAL]

*Attest:*

GERALD J. MOSSINGHOFF

*Attesting Officer* *Commissioner of Patents and Trademarks*